US010445572B2

(12) United States Patent
Mulder

(10) Patent No.: US 10,445,572 B2
(45) Date of Patent: *Oct. 15, 2019

(54) METHODS AND SYSTEMS FOR MONITORING DOCUMENTS EXCHANGED OVER EMAIL APPLICATIONS

(71) Applicant: Workshare Technology, Inc., San Francisco, CA (US)

(72) Inventor: Samuel Peter Matthew Mulder, London (GB)

(73) Assignee: Workshare Technology, Inc., San Francisco ( * ) Notice: Subject to any disclaimer, the term of this patent is extended or adjusted under 35 U.S.C. 154(b) by 0 days.

This patent is subject to a terminal disclaimer.

(21) Appl. No.: 16/007,320

(22) Filed: Jun. 13, 2018

(65) Prior Publication Data
US 2018/0300544 A1    Oct. 18, 2018

Related U.S. Application Data

(63) Continuation of application No. 13/306,765, filed on Nov. 29, 2011, now Pat. No. 10,025,759.
(Continued)

(51) Int. Cl.
*G06K 9/00* (2006.01)
*G06F 16/93* (2019.01)
(Continued)

(52) U.S. Cl.
CPC ......... *G06K 9/00483* (2013.01); *G06F 16/93* (2019.01); *G06F 17/10* (2013.01);
(Continued)

(58) Field of Classification Search
CPC ... G06K 9/00483; G06F 16/93; G06F 17/218; G06F 17/10; G06F 17/241; G06F 17/2211; H04L 51/22; H04L 51/08
See application file for complete search history.

(56) References Cited

U.S. PATENT DOCUMENTS

| 4,479,195 A | 10/1984 | Herr et al. |
| 4,949,300 A | 8/1990 | Christenson et al. |

(Continued)

FOREIGN PATENT DOCUMENTS

| JP | 10177650 | 6/1998 |
| JP | 2004265267 | 9/2004 |

(Continued)

OTHER PUBLICATIONS

Stephen Voida et al., Share and Share Alike: Exploring the User Interface Affordances of File Sharing, Apr. 22-27, 2006, ACM, pp. 1-10.

(Continued)

*Primary Examiner* — Michael A Keller
(74) *Attorney, Agent, or Firm* — Sabety + associates, PLLC; Ted Sabety

(57) ABSTRACT

Disclosed herein are methods and systems for monitoring and detecting changes in files attached to incoming emails. In one embodiment, if files are attached to an outgoing email, the change service uniquely tags each of the attached files and optionally stores local or remote copies of the tagged files. Additionally, in embodiments, the change service monitors and intercepts incoming emails. If files are attached to an incoming email, the change service identifies whether the files are tagged in a manner unique to the compare service. The change service then matches uniquely tagged files in the incoming email to corresponding files previously tagged by the change service. The change service then compares the two documents and generates reports that identify changes in the received document in relation to the transmitted document. Further, in embodiments, the change service provides visual indicators of the changes within the email application.

25 Claims, 8 Drawing Sheets

Related U.S. Application Data

(60) Provisional application No. 61/417,855, filed on Nov. 29, 2010, provisional application No. 61/417,869, filed on Nov. 29, 2010, provisional application No. 61/417,853, filed on Nov. 29, 2010, provisional application No. 61/417,858, filed on Nov. 29, 2010.

(51) Int. Cl.
    *G06F 17/22*     (2006.01)
    *G06F 17/24*     (2006.01)
    *G06F 17/10*     (2006.01)
    *G06F 17/21*     (2006.01)
    *H04L 12/58*     (2006.01)

(52) U.S. Cl.
    CPC ........ *G06F 17/218* (2013.01); *G06F 17/2211* (2013.01); *G06F 17/241* (2013.01); *H04L 51/08* (2013.01); *H04L 51/22* (2013.01)

(56) References Cited

U.S. PATENT DOCUMENTS

| | | | |
|---|---|---|---|
| 5,008,853 | A | 4/1991 | Bly et al. |
| 5,072,412 | A | 12/1991 | Henderson, Jr. et al. |
| 5,220,657 | A | 6/1993 | Bly et al. |
| 5,245,553 | A | 9/1993 | Tanenbaum |
| 5,247,615 | A | 9/1993 | Mori et al. |
| 5,293,619 | A | 3/1994 | Dean |
| 5,379,374 | A | 1/1995 | Ishizaki et al. |
| 5,446,842 | A | 8/1995 | Schaeffer et al. |
| 5,608,872 | A | 3/1997 | Schwartz et al. |
| 5,617,539 | A | 4/1997 | Ludwig et al. |
| 5,619,649 | A | 4/1997 | Kovnat et al. |
| 5,634,062 | A | 5/1997 | Shimizu et al. |
| 5,671,428 | A | 9/1997 | Muranaga et al. |
| 5,699,427 | A | 12/1997 | Chow et al. |
| RE35,861 | E | 7/1998 | Queen |
| 5,787,175 | A | 7/1998 | Carter |
| 5,787,444 | A | 7/1998 | Gerken et al. |
| 5,801,702 | A | 9/1998 | Dolan et al. |
| 5,806,078 | A | 9/1998 | Hug et al. |
| 5,819,300 | A | 10/1998 | Kohno et al. |
| 5,832,494 | A | 11/1998 | Egger et al. |
| 5,890,177 | A | 3/1999 | Moody et al. |
| 5,897,636 | A | 4/1999 | Kaeser |
| 5,898,836 | A | 4/1999 | Freivald et al. |
| 6,003,060 | A | 12/1999 | Aznar et al. |
| 6,012,087 | A | 1/2000 | Freivald et al. |
| 6,029,175 | A | 2/2000 | Chow et al. |
| 6,038,561 | A | 3/2000 | Snyder et al. |
| 6,049,804 | A | 4/2000 | Burgess et al. |
| 6,067,551 | A | 5/2000 | Brown et al. |
| 6,088,702 | A | 7/2000 | Plantz et al. |
| 6,128,635 | A | 10/2000 | Ikeno |
| 6,145,084 | A | 11/2000 | Zuili et al. |
| 6,189,019 | B1 | 2/2001 | Blumer et al. |
| 6,212,534 | B1 | 4/2001 | Lo et al. |
| 6,219,818 | B1 | 4/2001 | Freivald et al. |
| 6,243,091 | B1 | 6/2001 | Berstis |
| 6,263,350 | B1 | 7/2001 | Wollrath et al. |
| 6,263,364 | B1 | 7/2001 | Najork et al. |
| 6,269,370 | B1 | 7/2001 | Kirsch |
| 6,285,999 | B1 | 9/2001 | Page |
| 6,301,368 | B1 | 10/2001 | Bolle et al. |
| 6,317,777 | B1 | 11/2001 | Skarbo et al. |
| 6,321,265 | B1 | 11/2001 | Najork et al. |
| 6,327,611 | B1 | 12/2001 | Everingham |
| 6,336,123 | B2 | 1/2002 | Inoue et al. |
| 6,351,755 | B1 | 2/2002 | Najork et al. |
| 6,356,937 | B1 | 3/2002 | Montville et al. |
| 6,377,984 | B1 | 4/2002 | Najork et al. |
| 6,404,446 | B1 | 6/2002 | Bates et al. |
| 6,418,433 | B1 | 7/2002 | Chakrabarti et al. |
| 6,418,453 | B1 | 7/2002 | Kraft et al. |
| 6,424,966 | B1 | 7/2002 | Meyerzon et al. |
| 6,449,624 | B1 | 9/2002 | Hammack et al. |
| 6,505,237 | B2 | 1/2003 | Beyda et al. |
| 6,513,050 | B1 | 1/2003 | Williams et al. |
| 6,547,829 | B1 | 4/2003 | Meyerzon et al. |
| 6,556,982 | B1 | 4/2003 | McGaffey et al. |
| 6,560,620 | B1 | 5/2003 | Ching |
| 6,584,466 | B1 | 6/2003 | Serbinis et al. |
| 6,591,289 | B1 | 7/2003 | Britton |
| 6,594,662 | B1 | 7/2003 | Sieffert et al. |
| 6,596,030 | B2 | 7/2003 | Ball et al. |
| 6,614,789 | B1 | 9/2003 | Yazdani et al. |
| 6,658,626 | B1 | 12/2003 | Aiken |
| 6,662,212 | B1 | 12/2003 | Chandhok et al. |
| 6,738,762 | B1 | 5/2004 | Chen et al. |
| 6,745,024 | B1 | 6/2004 | DeJaco et al. |
| 6,832,202 | B1 | 12/2004 | Schuyler et al. |
| 6,918,082 | B1 | 7/2005 | Gross |
| 7,035,427 | B2 | 4/2006 | Rhoads |
| 7,085,735 | B1 | 8/2006 | Hall et al. |
| 7,107,518 | B2 | 9/2006 | Ramaley et al. |
| 7,113,615 | B2 | 9/2006 | Rhoads et al. |
| 7,152,019 | B2 | 12/2006 | Tarantola et al. |
| 7,181,492 | B2 | 2/2007 | Wen et al. |
| 7,194,761 | B1 | 3/2007 | Champagne |
| 7,212,955 | B2 | 5/2007 | Kirshenbaum et al. |
| 7,233,686 | B2 | 6/2007 | Hamid |
| 7,240,207 | B2 | 7/2007 | Weare |
| 7,299,504 | B1 | 11/2007 | Tiller et al. |
| 7,321,864 | B1 | 1/2008 | Gendler |
| 7,356,704 | B2 | 4/2008 | Rinkevich et al. |
| 7,434,164 | B2 | 10/2008 | Salesin et al. |
| 7,454,778 | B2 | 11/2008 | Pearson et al. |
| 7,496,841 | B2 | 2/2009 | Hadfield et al. |
| 7,564,997 | B2 | 7/2009 | Hamid |
| 7,570,964 | B2 | 8/2009 | Maes |
| 7,613,770 | B2 | 11/2009 | Li |
| 7,624,447 | B1 | 11/2009 | Horowitz et al. |
| 7,627,613 | B1 | 12/2009 | Dulitz et al. |
| 7,640,308 | B2 | 12/2009 | Antonoff et al. |
| 7,673,324 | B2 | 3/2010 | Tirosh et al. |
| 7,680,785 | B2 | 3/2010 | Najork |
| 7,685,298 | B2 | 3/2010 | Day |
| 7,694,336 | B2 | 4/2010 | Rinkevich et al. |
| 7,707,153 | B1 | 4/2010 | Petito et al. |
| 7,720,256 | B2 | 5/2010 | Desprez et al. |
| 7,730,175 | B1 | 6/2010 | Roesch et al. |
| 7,788,235 | B1 | 8/2010 | Yeo |
| 7,796,309 | B2 | 9/2010 | Sadovsky et al. |
| 7,797,724 | B2 | 9/2010 | Calvin |
| 7,818,678 | B2 | 10/2010 | Massand |
| 7,844,116 | B2 | 11/2010 | Monga |
| 7,857,201 | B2 | 12/2010 | Silverbrook et al. |
| 7,877,790 | B2 | 1/2011 | Vishik et al. |
| 7,890,752 | B2 | 2/2011 | Bardsley et al. |
| 7,895,166 | B2 | 2/2011 | Foygel et al. |
| 7,903,822 | B1 | 3/2011 | Hair et al. |
| 7,941,844 | B2 | 5/2011 | Anno |
| 7,958,101 | B1 | 6/2011 | Teugels et al. |
| 8,005,277 | B2 | 8/2011 | Tulyakov et al. |
| 8,042,112 | B1 | 10/2011 | Zhu et al. |
| 8,117,225 | B1 | 2/2012 | Zilka |
| 8,145,724 | B1 | 3/2012 | Hawks et al. |
| 8,181,036 | B1 | 5/2012 | Nachenberg |
| 8,196,030 | B1 | 6/2012 | Wang et al. |
| 8,201,254 | B1 | 6/2012 | Wilhelm et al. |
| 8,209,538 | B2 | 6/2012 | Craigie |
| 8,233,723 | B2 | 7/2012 | Sundaresan |
| 8,286,085 | B1 | 10/2012 | Denise |
| 8,286,171 | B2 | 10/2012 | More et al. |
| 8,301,994 | B1 | 10/2012 | Shah |
| 8,316,237 | B1 | 11/2012 | Felsher et al. |
| 8,406,456 | B2 | 3/2013 | More |
| 8,473,847 | B2 | 6/2013 | Glover |
| 8,478,995 | B2 | 7/2013 | Alculumbre |
| 8,555,080 | B2 | 10/2013 | More et al. |
| 8,572,388 | B2 | 10/2013 | Boemker et al. |
| 8,620,872 | B1 | 12/2013 | Killalea |
| 8,635,295 | B2 | 1/2014 | Mulder |
| 8,732,127 | B1 | 5/2014 | Rotterdam et al. |

(56) References Cited

U.S. PATENT DOCUMENTS

| | | |
|---|---|---|
| 8,776,190 B1 | 7/2014 | Cavage et al. |
| 8,797,603 B1 | 8/2014 | Dougherty et al. |
| 8,839,100 B1 | 9/2014 | Donald |
| 9,092,636 B2 | 7/2015 | More et al. |
| 9,098,500 B1 | 8/2015 | Asokan et al. |
| 9,311,624 B2 | 4/2016 | Diament et al. |
| 9,652,485 B1 | 5/2017 | Bhargava et al. |
| 2001/0018739 A1 | 8/2001 | Anderson et al. |
| 2001/0042073 A1 | 11/2001 | Saether et al. |
| 2002/0010682 A1 | 1/2002 | Johnson |
| 2002/0016959 A1 | 2/2002 | Barton et al. |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson, III |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1 | 4/2003 | Alley et al. |
| 2003/0084279 A1 | 5/2003 | Campagna |
| 2003/0093755 A1 | 5/2003 | Ramakrishnan |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2005/0278421 A1 | 12/2005 | Simpson et al. |
| 2006/0005247 A1 | 1/2006 | Zhang et al. |
| 2006/0013393 A1 | 1/2006 | Ferchichi et al. |
| 2006/0021031 A1 | 1/2006 | Leahy et al. |
| 2006/0047765 A1 | 3/2006 | Mizoi et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Todd et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves et al. |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112930 A1 | 5/2007 | Foo et al. |
| 2007/0150443 A1 | 6/2007 | Bergholz et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1 | 9/2007 | Thompson et al. |
| 2007/0253608 A1 | 11/2007 | Tulyakov et al. |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1 | 4/2008 | Fuschino et al. |
| 2008/0091735 A1 | 4/2008 | Fukushima et al. |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |

(56) References Cited

U.S. PATENT DOCUMENTS

| | | |
|---|---|---|
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 102008002960 | 4/2008 |
| KR | 1020080029602 | 4/2008 |
| WO | WO0060504 | 10/2000 |
| WO | 2001052473 A1 | 7/2001 |
| WO | 2002101577 A1 | 12/2002 |

OTHER PUBLICATIONS

Stolfo et al., AMT?MET: Systems for Modeling and Detecting Errant Email. 2003, IEEE 6 pages.

Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.

Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.

Tsai, et al., "A document Workspace for Collaboration and Annotation based on XML Technology", Department of Electrical Engineering, 2001, pp. 165-172.

Tsai, et al., "A Document Workspace for Collaboration and Annotation based on XML Technology", IEEE, 2000, pp. 165-172.

Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.

Tulyakov et al, Symmetric Hash Functions for Fingerprint Minutiae, ICAPR 2005, LNCS 3687, pp. 30-38, 2005.

Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.

Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.

U.S. Appl. No. 13/789,104, filed Mar. 7, 2013, Gofman.

User Permissions and Permission Levels (SharePoint Foundation 2010)(technet.microsoft.com) (Jan. 4, 2011), https://technet.microsoft.com/en-us/library/cc288074(v=office.14).aspx (last visited Feb. 27, 2017).

V Monga, B.L. Evans Perceptual image hashing via feature points: performance evaluation and tradeoffs IEEE Transactions on Image Processing, 15 (11) (2006), pp. 3453-3466.

Weiss et al., Lightweight document matching for help-desk applications, In: Intelligent Systems and their Applications, IEEE, Vo. 15, Issue:2, pp. 57-61, ISSN 1094-7167, 2000.

Wells et al., "Groupware & Collaboration Support", www.objs.com/survey/groupwar.htm, Aug. 30, 2001, 10 pages.

Written Opinion of PCT Application No. PCT/US2009/051313, dated Mar. 3, 2010, 3 pages.

Written Opinion of PCT Application No. PCT/US2009/051313, dated Mar. 3, 2010, 4 pages.

Written Opinion PCT Application No. PCT/2009/064919, dated Jul. 1, 2010, 4 pages.

(56) References Cited

OTHER PUBLICATIONS

Written Opinion PCT Application No. PCT/US2009/056651, dated Apr. 21, 2010, pp. 1-5.
Written Opinion PCT Application No. PCT/US2009/056668 dated Apr. 16, 2010 pp. 1-4.
Written Opinion PCT Application No. PCT/US2009/056668, dated Apr. 16, 2010, 4 pages.
Written Opinion PCT Application No. PCT/US2009/064919 dated Jul. 1, 2010, pp. 1-4 pages.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Opinion PCT Application No. PCT/US2009/065019 dated Jun. 4, 2010, pp. 1-5.
Written Opinion PCT Application No. PCT/US2009/065019, dated Jun. 4, 2010, 5 pages.
Written Opinion PCT Application No. PCT/US2010/043345 dated Apr. 28, 2011, 4 pages.
Written Opinion PCT/US2009/056651 dated Apr. 21, 2010, pp. 1-5.
XP-002257904, "Workshare Debuts Synergy", 2003, 3 pages.
Xuefeng Liang; et al., "Fingerprint Matching Using Minutia Polygons," Pattern Recognition, 2006, ICPR 2006, 18th International Conference on, vol. 1, No., pp. 1046-1049.
Xuefeng Liang; et al., "Fingerprint Matching Using Minutia Polygons," Pattern Recognition, 2006, ICPR 2006, 18th International Confernce on, vol. 1, No., pp. 1046-1049.
Xuefeng Liang; Tetsuo Asano; , "Fingerprint Matching Using Minutia Polygons," Pattern Recognition, 2006. ICPR 2006. 18th International Conference on , vol. 1, No., pp. 1046-1049.
Yung et al, Generating Robust Digital Signature for Image/Video Authentication, Multimedia and Security Workshop at ACM Multimedia '98, Bristol, U.K., Sep. 1998.
"3BClean".
"EzClean—Metadata removal utility for Microsoft Office".
"MIMEsweeper Solutions".
"CS MAILsweeper™ 4.3 for SMTP" by Clearswift Ltd (© 2002).
"EzClean—New Features—version 3.3".
"EzClean 3.2—New Features".
"EzClean FAQ".
"How do I make sure that there is no embarrassing Metadata in any documents that I attach to e-mails? ezClean makes it easy!"
"Lotus Announces cc:Mail for the World Wide Web; Provides EasyAccess to E-Mail via the Web".
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Think Your Deletions are Gone Forever? Think Again! ezClean Makes Metadata Removal Easy!"
3B Clean: What is the Problem? 3B is the solution.
3B Transform from 2005.
3BOpen Doc Making StarOffice and OpenOffice.org a viable option.
3BOpenDoc—Convert documents to and from OSF.
Advisory Action dated Apr. 12, 2013, in Co-Pending U.S. Appl. No. 12/621,429 by More, S., filed Nov. 18, 2009.
Advisory Action dated Apr. 12, 2013, in Co-Pending U.S. Appl. No. 12/621,429 of More, S., filed Nov. 18, 2009.
Advisory Action dated Nov. 1, 2013, in Co-Pending U.S. Appl. No. 13/659,793 by More, S., filed Oct. 24, 2012.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bitform Extract SDK 2005.1.
Bobba et al. Attribute-Based Messaging: Access Control and Confidentiality, 2010, ACM 35 pages.

Cawood, Stephen. How to Do Everything™ Microsoft® SharePoint® 2010. McGraw-Hill, 2010. ISBN 978-0-07-174367-9 (pbk). Copyright © 2010.
Chen et al., Online Detection and Prevention of Phishing Attacks, 2006, IEEE 7 pages.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Dominik Grolimund et al., Cryptree: A Folder Tree Structure for Cryptographic File Systems, Oct. 2-4, 2006, IEEE, pp. 189-198.
EZclean version 3.3 Installation Guide and Admin Manual.
EzClean version 3.3 Integration Guide for use with CS MailSweeper for SMTP.
Final Office Action dated Apr. 16, 2012 in Co-Pending U.S. Appl. No. 12/177,043, filed Jul. 21, 2008.
Non-Final Office Action dated May 7, 2008 in Co-Pending U.S. Appl. No. 10/023,010, filed Dec. 17, 2001, now U.S. Pat. No. 7,496,841.
Non-Final Office Action dated May 7, 2008 in Co-pending U.S. Appl. No. 10/023,010, filed Dec. 17, 2001.
Non-Final Office Action dated Sep. 19, 2011 for U.S. Appl. No. 12/177,043, filed Jul. 21, 2008.
Non-Final Office Action dated Sep. 19, 2011 in Co-Pending U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Non-Final Office Action dated Sep. 19, 2012 in Co-Pending U.S. Appl. No. 12/844,818 of Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al. filed Sep. 11, 2008.
Notice of Allowance dated Jun. 26, 2012 in Co-Pending U.S. Appl. No. 12/275,185 of More, S., filed Nov. 20, 2008.
Notice of Allowance dated Jun. 26, 2012 in Co-Pending U.S. Appl. No. 12/275,185, filed Nov. 20, 2008.
Notice of Allowance dated Mar. 13, 2013 in Co-Pending U.S. Appl. No. 12/844,818 by Glover, R., filed Jul. 27, 2010.
Notice of Allowance dated Mar. 13, 2013 in Co-Pending U.S. Appl. No. 12/844,818 of Glover, R., filed Jul. 27, 2010.
Notice of Allowance dated Oct. 2, 2012, in Co-Pending U.S. Appl. No. 12/275,185 by More, S., filed Nov. 20, 2008.
Notice of Allowance dated Oct. 2, 2012, in Co-Pending U.S. Appl. No. 12/275,185 of More, S., filed Nov. 20, 2008.
Notice of Allowance dated Oct. 24, 2008 in Co-pending U.S. Appl. No. 10/023,010, filed Dec. 17, 2001.
Notice of Allowance dated Oct. 24, 2008 in Co-Pending U.S. Appl. No. 10/023,010, filed Dec. 17, 2001, now U.S. Pat. No. 7,496,841.
Notice of Allowance dated Sep. 25, 2013, in Co-Pending U.S. Appl. No. 13/659,817 by More, S., filed Oct. 24, 2012.
Office Web Apps Overview (Installed on SharePoint 2010 Products), Technet.Microsoft.com (Jun. 11, 2010), https://technet.microsoft.com/en-us/library/11431685(v=office.14).aspx, (last visited Feb. 27, 2017).
Pattison,Ted et al. Inside Microsoft® SharePoint® 2010. Critical Path Training, LLC © 2011.
PC Magazine "Pure Intranets: Real-Time Internet Collaboration", Aug. 30, 2001.
PC Magazine "Pure Intranets: Real-Time Internet Collaboration", http://www.zdnet.com/pcmag/featuresgroupware/gpwst.htm, Aug. 30, 2001, 2 pages.

(56) References Cited

OTHER PUBLICATIONS

PC Magazine "Pure Intranets: Real-Time Internet Collaboration", http://www.zdnet.com/pcmag/featuresgroupware/pgwst.htm, Aug. 30, 2001, 2 pages.
PC Magazine "Pure Intranets: Real-Time Internet Collaboration", http://www.zdnet.com/pcmag/featuresgroupware/jpwst.htm, Aug. 30, 2001, 2 pages.
Restriction Requirement dated Jun. 30, 2006 for U.S. Appl. No. 10/136,733, filed Apr. 30, 2002.
Restriction Requirement dated Feb. 14, 2005 for U.S. Appl. No. 10/023,010, filed Dec. 17, 2001, now U.S. Pat. No. 7,496,841.
Restriction Requirement dated Feb. 14, 2005 in U.S. Appl. No. 10/023,010, filed Dec. 17, 2001, now U.S. Pat. No. 7,496,841.
Restriction Requirement dated Feb. 5, 2008 for U.S. Appl. No. 10/023,010, filed Dec. 17, 2001, now U.S. Pat. No. 7,496,841.
Restriction Requirement dated Feb. 5, 2008 in Co-Pending U.S. Appl. No. 10/023,010, filed Dec. 17, 2001, now U.S. Pat. No. 7,496,841.
Restriction Requirement dated Jun. 30, 2006 in U.S. Appl. No. 10/136,733, filed Apr. 30, 2002.
Roussev, et al., "Integrating XML and Object-based Programming for Distributed Collaboration", IEEE, 2000, pp. 254-259.
Sahil Malik. Microsoft SharePoint 2010: Building Solutions for SharePoint 2010 . Apress; 1st ed. edition (Jun. 7, 2010).
Silver, Michael A.; MacDonald, Neil. Plan to Deal with Metadata Issues with Windows Vista. Gartner, Inc. Dec. 21, 2005.ID No. G00136321.
Simple Mail Transfer Protocol, Internet Engineering Task Force(IETF), RFC 821 (Aug. 1982).
Workshare Ltd. Workshare Protect 4.5 Admin Guide, (c) 2006.
Final Office Action dated Apr. 17, 2007 for U.S. Appl. No. 10/023,010, filed Dec. 17, 2001, now U.S. Pat. No. 7,496,841.
Final Office Action dated Apr. 17, 2007 for U.S. Appl. No. 10/023,010, filed Dec. 7, 2001, now U.S. Pat. No. 7,496,841.
Final Office Action dated Apr. 17, 2007 in Co-Pending U.S. Appl. No. 10/023,010, filed Dec. 17, 2001, now U.S. Pat. No. 7,496,841.
Final Office Action dated Aug. 12, 2011 for U.S. Appl. No. 12/209,096, filed Sep. 11, 2008.
Final Office Action dated Aug. 12, 2011 in Co-Pending U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 by More, S., filed Nov. 18, 2009.
Final Office Action dated Feb. 1, 2013 in Co-Pending U.S. Appl. No. 12/621,429 of More, S., filed Nov. 18, 2009.
Final Office Action dated Jan. 18, 2013 in Co-Pending U.S. Appl. No. 12/844,818 by Glover, R., filed Jul. 27, 2010.
Final Office Action dated Jan. 18, 2013 in Co-Pending U.S. Appl. No. 12/844,818 of Glover, R., filed Jul. 27, 2010.
Final Office Action dated May 10, 2012 in Co-Pending U.S. Appl. No. 12/209,082, filed Sep. 11, 2008.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
International Search Report of PCT Application No. PCT/IB2002/005821, dated Jan. 30, 2004, 6 pages.
International Search Report of PCT Application No. PCT/2009/064919, dated Jul. 1, 2010, 3 pages.
International Search Report of PCT Application No. PCT/IB2002/005821, dated Jan. 3, 2004, 6 pages.
International Search Report of PCT Application No. PCT/IB2002/005821, dated Jan. 30, 2004, 6 pages.
International Search Report of PCT Application No. PCT/US2009/051313, dated Mar. 3, 2010, 3 pages.
International Search Report of PCT Application No. PCT/US2009/056651, dated Apr. 21, 2010, pp. 1-3.
International Search Report of PCT Application No. PCT/US2009/056668 dated Apr. 16, 2010, pp. 1-9.
International Search Report of PCT Application No. PCT/US2009/056668, dated Apr. 16, 2010, 9 pages.
International Search Report of PCT Application No. PCT/US2009/064919 dated Jul. 1, 2010, pp. 1-3.
International Search Report of PCT Application No. PCT/US2009/065019 dated Jun. 4, 2010, pp. 1-6.
International Search Report of PCT Application No. PCT/US2009/065019, dated Jun. 4, 2010, 6 pages.
International Search Report of PCT Application No. PCT/US2010/043345, dated Apr. 28, 2011, 3 pages.
International Search Report PCT/US2010/043345 dated Apr. 28, 2011, 3 pages.
Jain, Pravin. The class of JAVA. Aug. 12, 2010.
Jamison, Scott. Essential SharePoint 2010: Overview, Governance, and Planning. Addison-Wesley Professional; 1 edition (Aug. 22, 2010).
Kamouskos et al., Active Electronic Mail, 2002, ACM 6 pages.
Kaushik et al., Email Feedback: A Policy based Approach to Overcoming False Positives, 2005, 10 pages.
Lightfoot, Johnathan and Beckett, Chris. Plain & Simple Microsoft® SharePoint® 2010. O'Reilly Media, Inc. Copyright © 2010.
Londer, Olga and Coventry, Penelope. Step by Step Microsoft® SharePoint® Foundation 2010. Microsoft Press. ISBN: 978-0-7356-2726-0. Copyright © 2011.
M. Eric Johnson et al., The Evolution of the Peer-to-Peer File Sharing Industry and the Security Risks for Users, Jan. 1-10, 2008, IEEE, pp. 1-10.
Mango, "Robust Perceptual Image Hashing Using Feature Points," http://bluecoat-02/?cfru= aHR0cDovL3NpZ25hbC51Y2UudXRIeGFzLmVkdS9+dmIzaGFs- L2hhc2gtcGFydEkucHM=, 2003.
Mango, et al., "Perceptual Image Hashing via Feature Points: Performance Evaluation and Tradeoffs," IEEE Transactions on Image Processing, vol. 15, No. 11, Nov. 2006.
Mango, Robust Perceptual Image Flashing Using Feature Points, http://bluecoat-02/?cfru= aHR0cDovL3NpZ25hbC5IY2UudXRIeGFzLmVkdS9+dmizaGFs- L2hhc2gtcGFydEkucHM=, 2003.
Microsoft SharePoint 2010 SDK: Building Block: Files and Documents, msn.microsoft.com (Nov. 1, 2010), https://msdn.microsoft.com/en-us/library/office/ee538269(v=office.14).aspx, (last visited Feb. 27, 2017).
Microsoft SharePoint 2010 SDK: How to: Upload a File to a SharePoint Site from a Local Folders, msn.microsoft.com (Jul. 7, 2010), https://msdn.microsoft.com/en-us/library/office/ms454491(v=office.14).aspx, (last visited Feb. 27, 2017).
Microsoft SharePoint 2010 White Paper , Microsoft.com, www.microsoft.com/downloads/en/details.aspx?familyid=5c562f71-3aa9-46fd-abac-7d381813f2b8 (Sep. 2010), www.microsoft.com/downloads/en/details.aspx?FamilyID=5c562f71-3aa9-46fd-abac-7d381813f2b8 (last visited Feb. 27, 2017).
Microsoft, "Microsoft XP, Product Guide", pp. 1-26, 2001.
Microsoft, "Microsoft XP, Product Guide", pp. 1-26.
Monga, "Robust Perceptual Image Hashing Using Feature Points," http://bluecoat-02/?cfru= aHR0cDovL3NpZ25hbC51Y2UudXRIeGFzLmVkdS9+dmIzaGFs- L2hhc2gtcGFydEkucHM=, 2003.
Monga, "Robust Perceptual Image Hashing using Feature Points," http://bluecoat-02/?cfru= aHR0cDovL3NpZ25hbC51Y2UudXRIeGFzLmVkdS9+dmIzaGFs- L2hhc2gtcGFydEkucHM=, 2003.
Monga, "Robust Perceptual Image Hashing Using Feature Points," http://bluecoat-02/?cfru= aHROcDovL3NpZ25hbC51Y2UudXRIeGFzLmVkdS9+dmIzaGFs- L2hhc2gtcGFydEkucHM=, 2003.
Monga, et al., "Perceptual Image Hashing via Feature Points: Performance Evaluation and Tradeoffs," IEEE Transactions on Image Processing, vol. 15, No. 11, Nov. 2006.
Monga, et al., "Perceptual Image Hashing via Feature Points: Performance Evaluation and Tradeoffs," IEEE Transactions on Image Processing, vol. 15, No. 11, Nov. 2006.

(56) References Cited

OTHER PUBLICATIONS

Monga, V. et al., Perceptual image hashing via feature points: performance evaluation and tradeoffs IEEE Transactions on Image Processing, 15 (11) (2006), pp. 3453-3466.

Nathaniel S. Good et al., Usability and privacy: a study of KaZaA P2P file-sharing, Apr. 5-10, 2003, ACM, vol. No. 5, Issue No. 1, pp. 137-144.

Non-Final Office Action dated Apr. 27, 2012 in Co-Pending U.S. Appl. No. 12/275,185, filed Nov. 20, 2008.

Non-final office action issued for U.S. Appl. No. 13/799,067 dated Oct. 30, 2014.

Non-Final Office Action dated Apr. 26, 2013 in Co-Pending U.S. Appl. No. 13/659,817 by More, S., filed Oct. 24, 2012.

Non-Final Office Action dated Apr. 26, 2013 in Co-Pending U.S. Appl. No. 13/659,817 of More, S., filed Oct. 24, 2012.

Non-Final Office Action dated Apr. 27, 2012 in Co-Pending U.S. Appl. No. 12/275,185 of More, S., filed Nov. 20, 2008.

Non-Final Office Action dated Aug. 1, 2012 in Co-Pending U.S. Appl. No. 12/621,429, filed Nov. 18, 2009.

Non-Final Office Action dated Aug. 1, 2012 in Co-Pending U.S. Appl. No. 12/621,429, of More, S., filed Nov. 18, 2009.

Non-Final Office Action dated Aug. 13, 2013 in co-pending U.S. Appl. No. 13/306,819 by Glover, R.W., filed Nov. 29, 2011.

Non-Final Office Action dated Dec. 22, 2011 in Co-Pending U.S. Appl. No. 12/209,082.

Non-Final Office Action dated Dec. 6, 2012 in co-pending U.S. Appl. No. 13/306,798, filed Nov. 29, 2011.

Non-Final Office Action dated Jan. 9, 2012 in Co-Pending U.S. Appl. No. 12/177,043, filed Jul. 21, 2008.

Non-Final Office Action dated Mar. 11, 2011 in Co-Pending U.S. Appl. No. 12/209,096, filed Sep. 11, 2008.

Non-Final Office Action dated Mar. 16, 2006 for U.S. Appl. No. 10/023,010, filed Dec. 17, 2001, now U.S. Pat. No. 7,496,841.

Non-Final Office Action dated Mar. 16, 2006 in Co-Pending U.S. Appl. No. 10/023,010, filed Dec. 17, 2001, now U.S. Pat. No. 7,496,841.

Non-Final Office Action dated Mar. 18, 2013 in Co-Pending U.S. Appl. No. 13/659,793 by More, S., filed Oct. 24, 2012.

Non-Final Office Action dated Mar. 18, 2013 in Co-Pending U.S. Appl. No. 13/659,793 of More, S., filed Oct. 24, 2012.

Non-Final Office Action dated Mar. 20, 2006 in Co-pending U.S. Appl. No. 10/136,733, filed Apr. 30, 2002.

Non-Final Office Action dated Mar. 20, 2006 in U.S. Appl. No. 10/136,733, filed Apr. 30, 2002.

Non-Final Office Action dated May 17, 2013 in co-pending U.S. Appl. No. 13/306,765 by Mulder, S. P. M, filed Nov. 29, 2011.

ial Application No. 61/417,855 filed Nov. 29, 2010. All
METHODS AND SYSTEMS FOR MONITORING DOCUMENTS EXCHANGED OVER EMAIL APPLICATIONS

PRIORITY CLAIM

This application is a continuation of U.S. patent application Ser. No. 13/206,765, filed Nov. 29, 2011, which claims the benefit of U.S. Provisional Application No. 61/417,853, filed Nov. 29, 2010, U.S. Provisional Application No. 61/417,869, filed Nov. 29, 2010, U.S. Provisional Application No. 61/417,858 filed Nov. 29, 2010 and U.S. Provisional Application No. 61/417,855 filed Nov. 29, 2010. All of which are hereby incorporated by reference in their entireties.

Additionally, this application relates to using comparison techniques discussed in the following patent applications, each of which is incorporated herein in its entirety: U.S. patent application Ser. No. 10/023,010, filed Dec. 17, 2002, issued as U.S. Pat. No. 7,496,841; U.S. patent application Ser. No. 12/177,043, filed Jul. 21, 2008, issued as U.S. Pat. No. 8,286,171; U.S. patent Ser. No. 12/275,185, filed Nov. 20, 2008, now issued as U.S. Pat. No. 8,406,456; and U.S. patent application Ser. No. 12/844,818, filed Jul. 27, 2010, now issued as U.S. Pat. No. 8,473,847.

FIELD OF INVENTION

The present invention generally relates to the field of digital document review. More particularly, the present invention relates to methods and systems for monitoring documents exchanged over email applications.

BACKGROUND

Document collaboration is a way by which multiple document editors can make edits to a central copy of a document. The edits made by each contributing author is collectively captured. In some instances, a primary editor may then accept or reject edits or content contributed by the other authors. There is a variety of document collaboration software in the market that enables the functionality described above. However, as indicated, such document collaboration software is geared toward multiple authors working together. Often, a primary author has to be designated and contributing authors have to be identified.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

In a more day-to-day occurrence, users create documents (e.g., Word® documents, PowerPoint® slide decks, etc.) that they distribute to one or more users for review. Often times, a recipient of the document may have contributions to the documents in the form of one or more edits. The receiving user may then return an edited form of the document back to the original user. Unless the original user installs document collaboration software, hassles with designating authors, and sends documents through the document collaboration software, the user will not be able to track changes made to the document. Such a process would be time consuming, expensive, and would also require the user to go completely out of his normal routine to get the process established. For an average user who sends out dozens of documents a day and returns quite a few back with edits, the document collaboration software is just not an option. In the normal scenario, when a user receives an edited version of a document from another user (that the user originally sent to the other user), the user may or may not know whether the document was actually edited by the other user. Also, even if the document was edited, the user may have no way of realizing what the changes were, and so would not be able to accept or ignore (or at the very least, acknowledge) the changes.

Figure 1A:
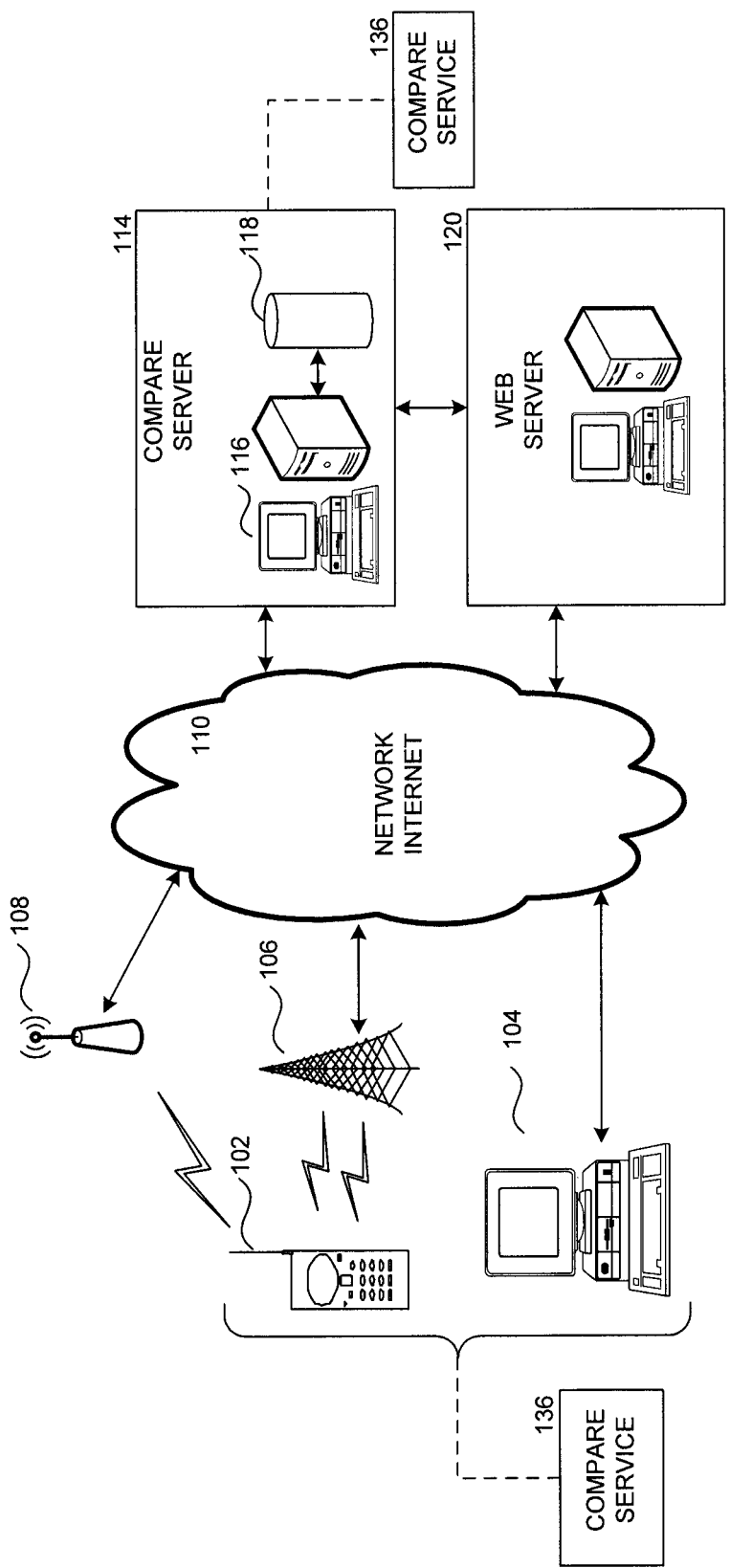

Overall, the examples herein of some prior or related systems and their associated limitations are intended to be illustrative and not exclusive. Other limitations of existing or prior systems will become apparent to those of skill in the art upon reading the following Detailed Description.

SUMMARY OF THE DESCRIPTION

At least one embodiment of this invention pertains to a compare service for monitoring and detecting changes in files attached to an incoming email. In one embodiment, the change service monitors emails that a user intends to transmit using an email application. If files are attached to an outgoing email, the change service uniquely tags each of the attached files and optionally stores local or remote copies of the tagged files. Additionally, in embodiments, the change service monitors and intercepts incoming emails directed to the user. If files are attached to an incoming email, the change service identifies whether the files are tagged in a manner unique to the compare service. The change service then matches any such uniquely tagged files in the incoming email to corresponding files previously tagged by the change service. In embodiments, the change service compares the two documents and generates reports that identify changes in the received document in relation to the transmitted document.

Further, in embodiments, the change service provides visual indicators of the changes within the email application. For example, the change service may include a change indicator field within the email application (in addition to, for example, the conventional fields such as subject indicator, sender indicator, received time indicator, etc.) indicating that the received document includes at least one change. In another example, the change service may include a visual description of the amount of changes (e.g., in the form of a percentage difference in contents of the files) in the received file in relation to the transmitted file.

Other advantages and features will become apparent from the following description and claims. It should be understood that the description and specific examples are intended for purposes of illustration only and not intended to limit the scope of the present disclosure.

BRIEF DESCRIPTION OF DRAWINGS

Figure 1B:
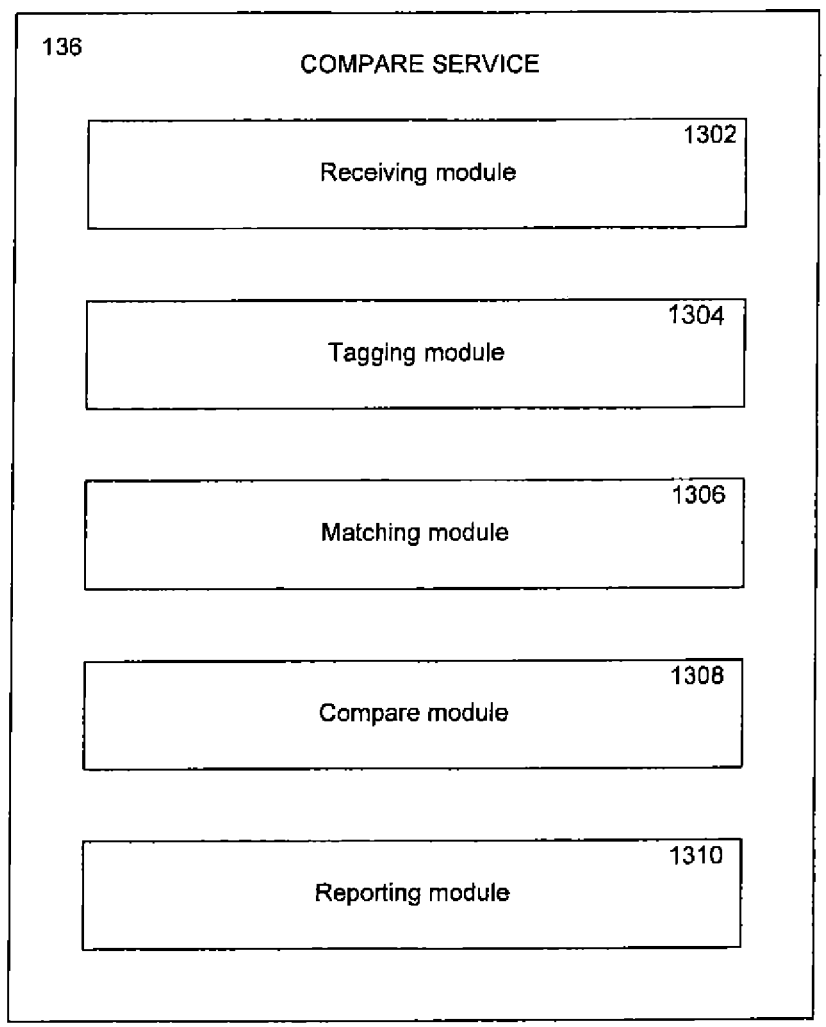
Figure 1C:
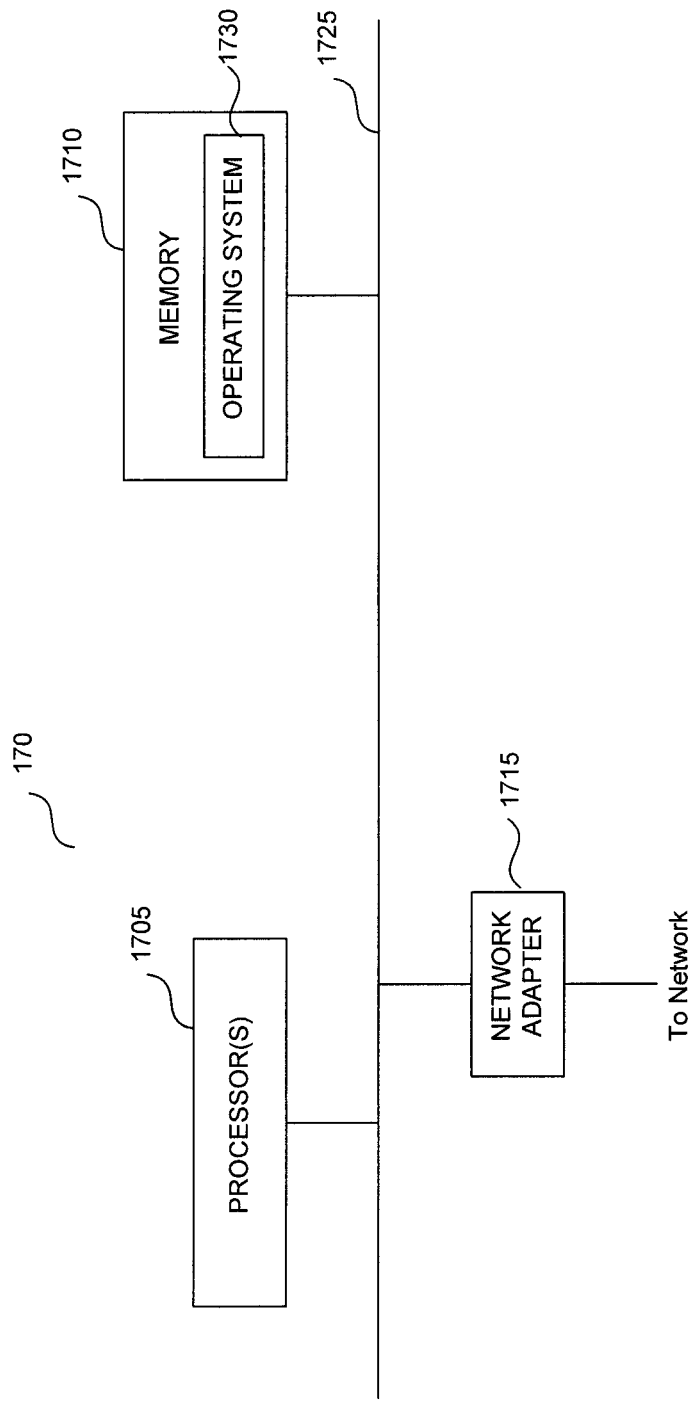
Figure 2A:
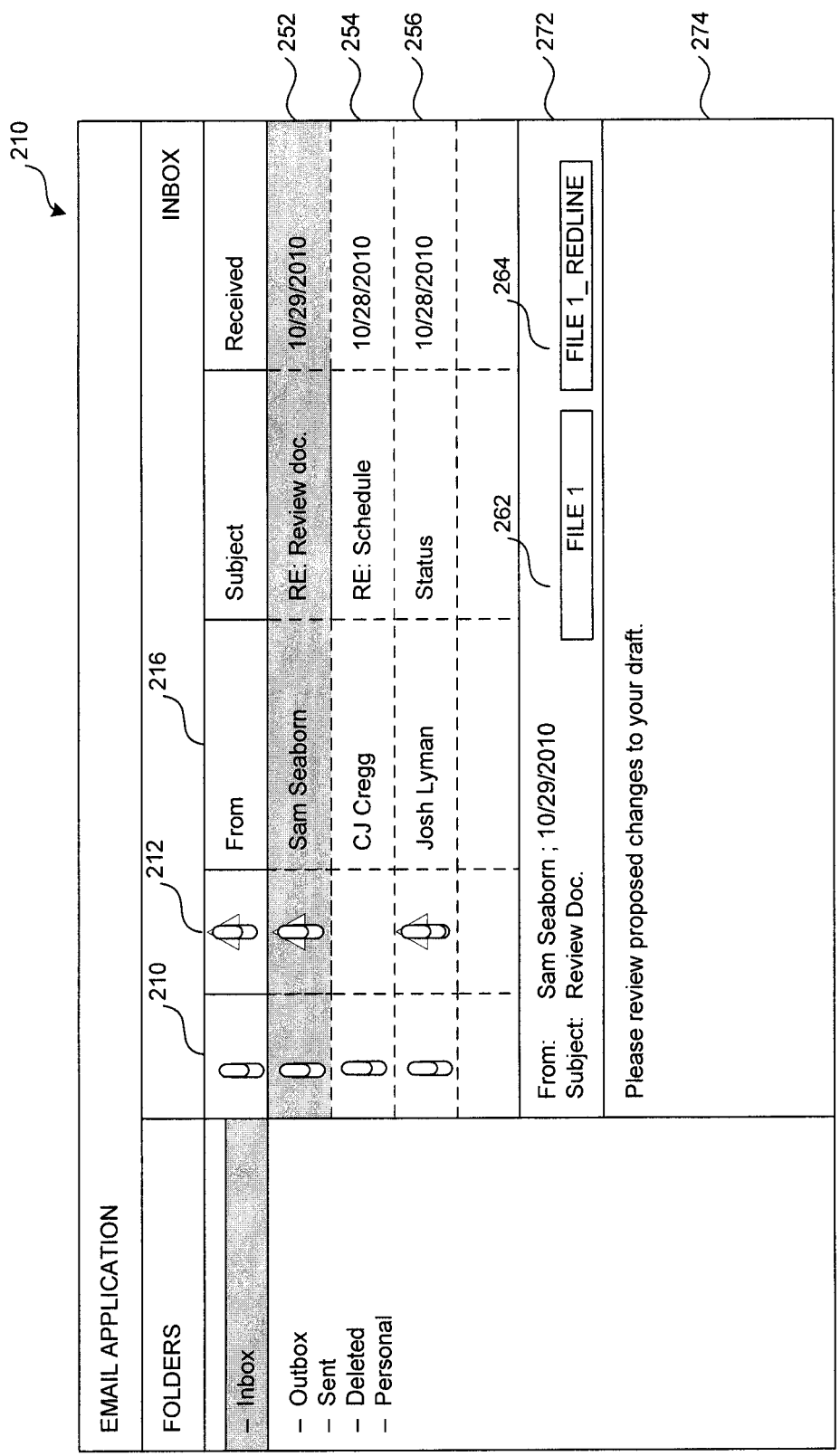
Figure 2B:
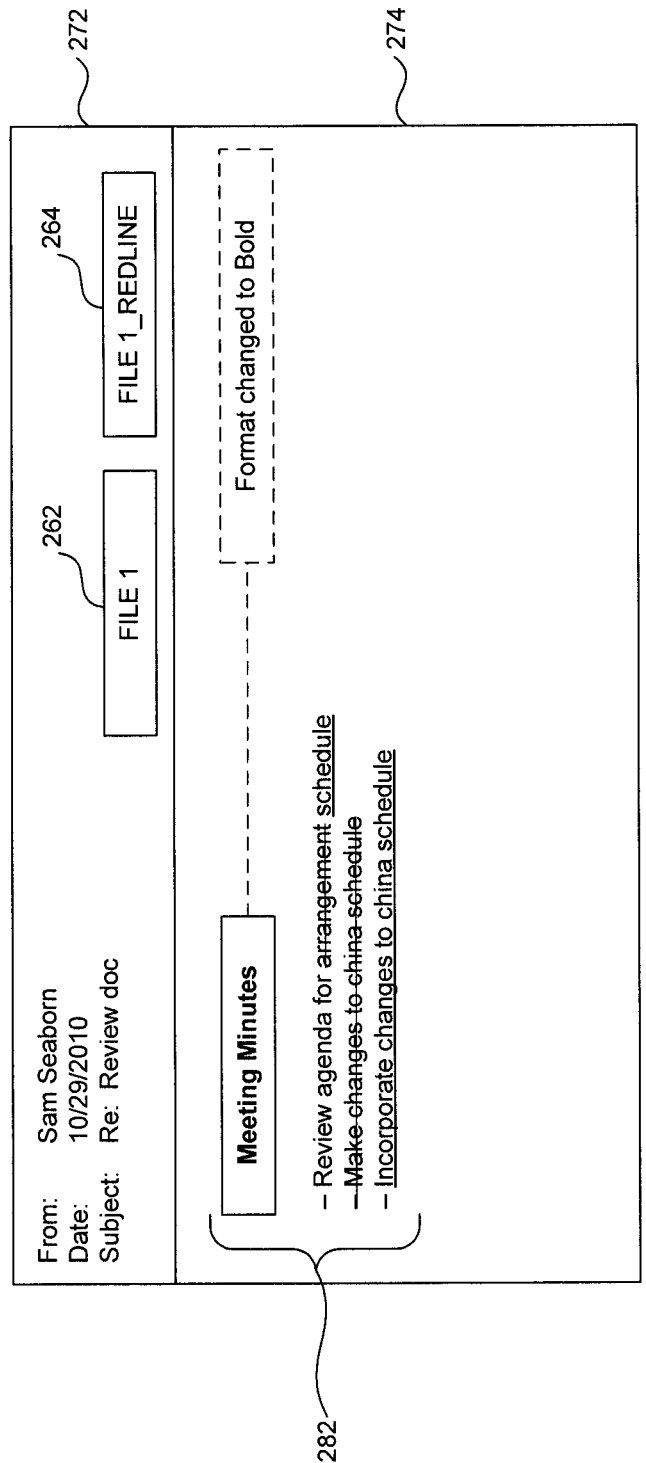
Figure 2C:
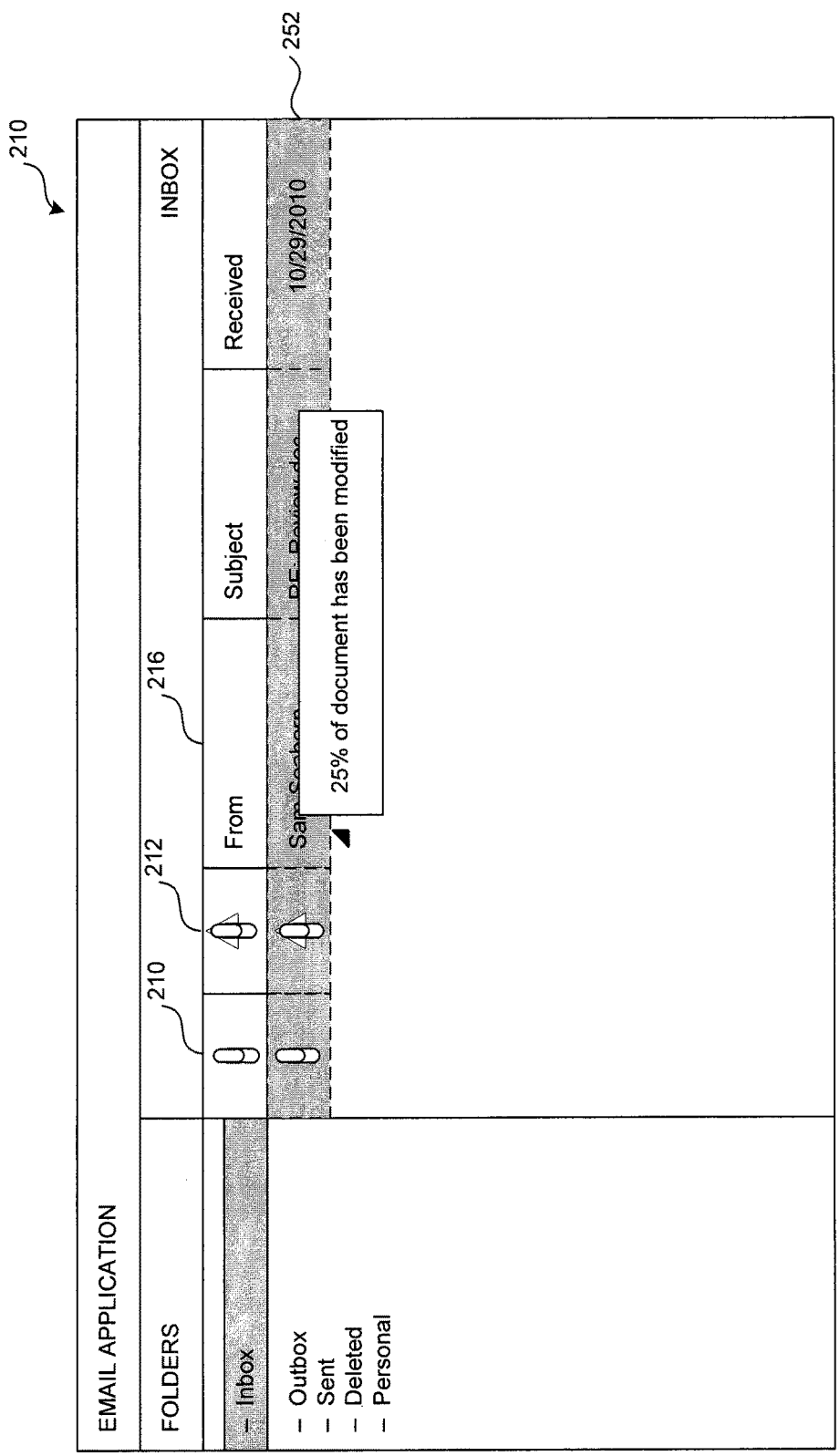
Figure 3A:
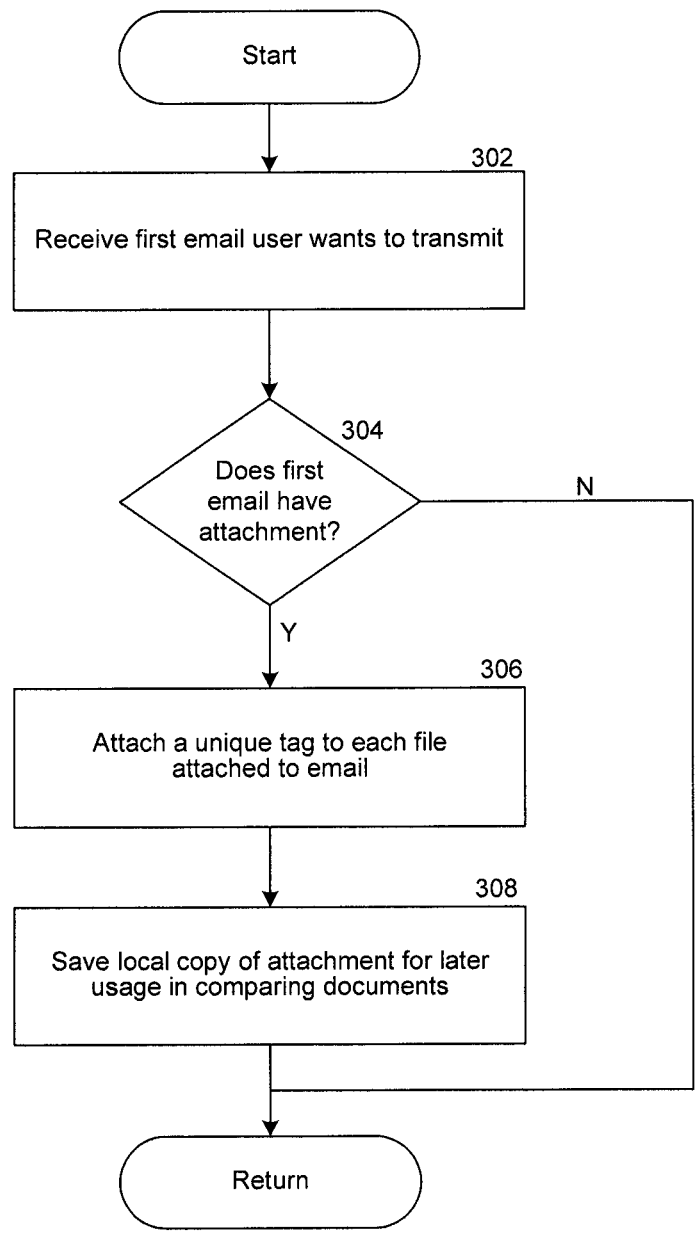
Figure 3B:
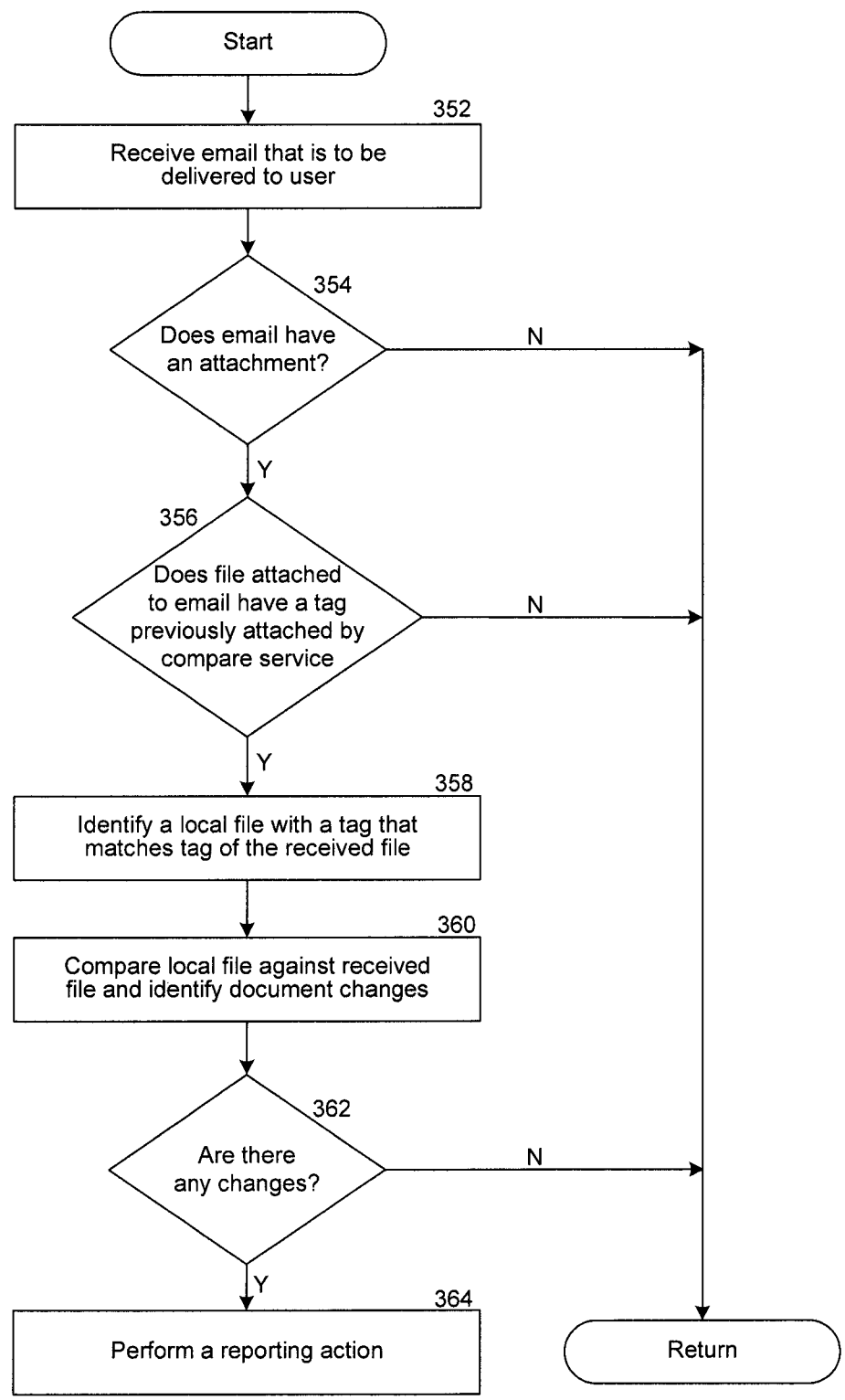

These and other objects, features and characteristics of the present invention will become more apparent to those skilled in the art from a study of the following detailed description in conjunction with the appended claims and drawings, all of which form a part of this specification. In the drawings:

FIG. 1A and the following discussion provide a brief, general description of a representative environment in which the invention can be implemented;

FIG. 1B is a block diagram illustrating an exemplary architecture of a compare service;

FIG. 1C is a high-level block diagram showing an example of the architecture for a computer system;

FIGS. 2A-2C provide illustrations of how the change service is implemented within an email application;

FIGS. 3A-3B are flow diagrams depicting process flows of the change service functionalities. The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1A and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1A, a user may use a personal computing device (e.g., a mobile computing device 104, a personal computer 102, etc.) to execute functionalities for the techniques described herein. The user may also use the personal computing device to communicate with a network. The term "mobile computing device," as used herein, may be a laptop, a netbook, a personal digital assistant (PDA), a smart phone (e.g., a Blackberry®, an Iphone®, etc.), a portable media player (e.g., an IPod Touch®), or any other device having communication capability to connect to the network. In one example, the mobile computing device 104 connects to the network using one or more cellular transceivers or base station antennas (not shown in FIG. 1), access points, terminal adapters, routers or modems 106 (in IP-based telecommunications implementations), or combinations of the foregoing (in converged network embodiments).

In some instances, the network 110 is the Internet, allowing the personal computing device to access functionalities offered through, for example, the compare server 120 or various web servers. In some instances, the network is a local network maintained by a private entity or a wide area public network, or a combination of any of the above types of networks. In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

As shown in FIG. 1A, in some instances, the personal computing device may have a compare service 136 installed locally. In such instances, and as will be explained in detail below, the compare service 136 locally monitors one or more email applications (e.g., Microsoft Outlook®) to detect attachments in incoming or outgoing emails. In some instances, the compare service 136 has an associated storage space in the personal computing device 102 or 104 to store local copies of documents and to be able to tag documents using unique tagging sequences. In some instances, while the compare service 136 may run on the personal computing device, it may use data storage capabilities of a remote server (e.g., compare server 114) to perform the various functionalities described herein. In embodiments, the compare service is installed as a protect agent at egress points (e.g., the email application or the email server) with local lightweight or complete database structures. Detailed explanation of such egress points, protect agents, and local lightweight/complete databases is provided in detail in U.S. application Ser. No. 12/209,096, filed Sep. 11, 2008, entitled "METHODS AND SYSTEMS TO IMPLEMENT FINGERPRINT LOOKUPS ACROSS REMOTE AGENTS," and further in U.S. application Ser. No. 12/209,082, filed Sep. 11, 2008, entitled "METHODS AND SYSTEMS FOR PROTECT AGENTS USING DISTRIBUTED LIGHTWEIGHT FINGERPRINTS," which are both incorporated herein in their entireties.

In some instances, the compare service 136 is configured by logic to run remotely on a compare server 120. In one example, the compare service is run akin to a web or internet service in conjunction with a web server 122. As explained above, a user may use a personal computing device to connect to the compare server 114 using the network (e.g., a local office network, the Internet, etc.). In such an embodiment, the compare server 114 may connect to an email server associated with the personal computing devices 102, 104 to monitor incoming or outgoing email applications, and to perform other functions (such as, e.g., tagging functions, document compare functions, reporting functions, etc.) remotely on the compare server 114. In one example, the compare service may operate both locally at the site of the personal computing device and remotely in conjunction with, for example, an email server. In embodiments, the web server 116 may function as the email server associated with email applications included in the personal computing devices. In such examples, the remote service may directly communicate with the email server to intercept and monitor incoming or outgoing emails from a user and perform corresponding tagging, comparing, and reporting functionalities. The local service may in turn operate in conjunction with the remote service to receive updates regarding changes in specific file attachments and perform operations to report the changes to the user. Other examples of installing the compare service 136 either locally at the site of the personal computing device or as a remote functionality, as may be contemplated by a person of ordinary skill in the art, may be substituted for the functionalities described herein.

In embodiments, the compare service 136 maybe customized by use of a "compare service" control panel within an email application used by a user on the personal computing device 102, 104. Such an email application may include a POPS or other push type email applications (such as, for example, Microsoft Outlook®, etc.) or may be web based email applications (such as, for example, Yahoo® email, etc.). In either case, the user may be presented with a set of control options to enable or disable features relating to the compare service. In one example, the user may be able to selectively enable or disable the compare service 136 functionalities. In one example, the user may be able to enable the compare service, but only for certain types of documents (e.g., only for word based documents, but not for image files or other document types, etc.). In one example, the user may be able to enable the compare service, but customize the type of reporting indicators (e.g., report only that a change is present in a document returned to the user, or report that a change is present and also report a percentage change in the received document in relation to the sent document, etc.). In one example, the user may be able to customize the type of reporting displays (e.g., receive the returned document and, in addition, receive a redline document identifying changes in received document in redline format; receive the returned document, and in addition, receive the redline version as embedded text within the email, etc.). Additional functionalities, as may be contemplated by a user of ordinary skill in the art, may also be utilized herein. The following sections describe the various functionalities of the compare service 136 in greater detail.

FIG. 1B is a block diagram illustrating an exemplary architecture of a compare service 136. In the illustrated embodiment, the compare service includes a plurality of functional modules, where each of the functional modules is configured by logic to perform a unique function of the compare service. The various functional modules can be implemented by using programmable circuitry programmed by software and/or firmware, or by using special-purpose hardwired circuitry, or by using a combination of such embodiments. In some instances, the functional modules are implemented as units in a processor of the deals server.

The functional modules include a receiving module 1302. In embodiments, the receiving module 1302 is configured by logic to operate, for example, in tandem with an email server or directly with the email application to monitor incoming and outgoing emails.

In the case of an outgoing email (i.e., an email a user intends to transmit to another user using the email application), the reporting module 1302 first determines whether the email includes one or more attachments. If the receiving module 1302 detects such attachments, the receiving module uniquely tags each of the attachments. Tagging is performed by means of the tagging module 1304 of the compare service 136. In some instances, the reporting module stores (either locally or remotely in the compare server 114) metadata information relating to the document and the document tagging for use in further operations. In some instances, the reporting module 1302 may further establish an additional copy of the files (i.e., the attachments) and store it in conjunction with the tagging metadata information for use in subsequent comparison operations. By maintaining this additional local copy, the compare service 136 is able to compare a received (changed) version of the document with the original document the user sent out, even if the user makes interim changes to the user's copy of the documents. Additionally, in embodiments, maintaining these additional copies in the remote compare server 114 enables remote operation of the compare service 136.

In the case of an incoming email (i.e., an email intended for the user that is transmitted by another person), the reporting module 1302 intercepts the email and performs one or more checks. For example, the reporting module first verifies whether the incoming email includes one or more attachments. If the reporting module identifies such attachments, the reporting module 1302 then determines whether the files (i.e., the attachments) are tagged in a manner consistent with the tagging performed by the tagging module 1304. If such tagging is identified, the reporting module 1302 then submits the received files (i.e., the attachments) to the matching module 1306.

The matching module 1306 compares the tagging information (or other such metadata) associated with the received files with the tagging information of the files the compare service 136 previously tagged (and in some instances, the files for which the compare service 136 made additional copies for subsequent comparison operations). If the matching module 1306 identifies such matching files, the matching module submits the received files and their "matched" counterparts to the compare module 1308 for comparison operations. The compare module 1308 compares the files to identify changes to the files.

The compare module 1308 may utilize any comparison mechanism, as may be contemplated by a person of ordinary skill in the art, for comparing the received files. As previously indicated, the files may be of any format-type that can be perused and compared by the compare service 136. For example, the files may be textual documents created using word-processing software (e.g., MS Word® documents, Acrobat® documents, etc.), slide decks or presentation files, image files, audio files, video files, etc. In embodiments, the compare module 1308 may compare one or more of the textual information, the multimedia information, the formatting information, the image information, etc. of the two files that are compared.

Additionally, the compare module 1308 may also generate comparison reports for use by the reporting module. In one example, the compare module 1308 may generate a new redline document corresponding to the file contained in the incoming email. The redline document would provide a direct comparison, in redline format, of the file in the incoming email and a corresponding (counterpart) file that was previously transmitted by the user. In one example, the compare module may compute a percentage of difference between the received file and the transmitted file. In one example, the compare module 1308 generates a detailed analysis of the type of changes, in terms of the type of changes. In an illustrate example, detailed report may include the following details: "20% textual changes, 60% image changes, 20% formatting changes."

The reporting module 1310 performs various reporting functionalities of the compare service 136. In embodiments, the reporting module interacts with the email application to provide a visual indicator (in relation to the received email) to indicate that an attachment includes changes (as identified by, for example, the compare module 1308). In embodiments, the reporting module 1310 may display information generated by the compare module 1308 (such as, e.g., difference values indicating percentage difference between received and transmitted files) in one or more formats based on prior control settings established by the user. Exemplary illustrations of such displays are discussed below with reference to FIGS. 2A-2C.

FIG. 1C is a high-level block diagram showing an example of the architecture for a computer system 170 that can be utilized to implement a personal computing device (e.g., 102 from FIG. 1A) for running a comparison service, a compare server 114, or a web server (e.g., 120 from FIG. 1A), etc. In FIG. 1C, the computer system 170 includes one or more processors 1705 and memory 1710 connected via an interconnect 1725. The interconnect 1725 is an abstraction that represents any one or more separate physical buses, point to point connections, or both connected by appropriate bridges, adapters, or controllers. The interconnect 1725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 1705 may include central processing units (CPUs) to control the overall operation of, for example, the host computer. In certain embodiments, the processor(s) 1705 accomplish this by executing software or firmware stored in memory 1710. The processor(s) 1705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1710 is or includes the main memory of the computer system 170. The memory 180 represents any form of random access memory (RAM), read-only memory (ROM), flash memory (as discussed above), or the like, or a combination of such devices. In use, the memory 180 may contain, among other things, a set of machine instructions which, when executed by processor 1705, causes the processor 1705 to perform operations to implement embodiments of the present invention.

Also connected to the processor(s) 1705 through the interconnect 1725 is a network adapter 1715. The network adapter 1715 provides the computer system 170 with the ability to communicate with remote devices, such as the storage clients, and/or other storage servers, and may be, for example, an Ethernet adapter or Fiber Channel adapter. FIG. 2A is an illustration of an email application 210 depicting the functionalities of the compare service 136. An example of an "inbox" view of email application 210 is provided. As may be readily perceived by a person of ordinary skill in the art, the "inbox" view (or any folder view within the email application) typically includes fields such as a "From" indicator 216, a "Subject" indicator 218, a "Received date/time" indicator 220, an "Attachment" indicator 210, etc. The attachment indicator 210 typically indicates whether a received email includes, as an attachment, at least one file. In connection with the compare service discussed herein, a new field of the compare service, a "compare" indicator 212, is introduced to the inbox view. This compare indicator 212 represents whether at least one file attached to an email has changed in relation to a previously transmitted file (as determined by the compare service 136).

In the illustration of FIG. 2A, items 252, 254, and 256 are indicators of received emails. Email indicator 252 indicates that at least one file is attached to the email (as indicated in the attachment indicator field 210). Furthermore, in this example, the compare service 136 has determined that at least one of the files has "changed" in relation to a version of the file previously transmitted by the user. Accordingly, the compare indicator field 212 of email indicator 252 is enabled. In this example, a visual indicator in the form of an icon is displayed in the compare indicator field 212 to provide an alert to the user that there is a change in at least one of the files attached to email 252.

Email indicator 254 also has at least one file attached to it (as indicated by the attachment indicator field 210). However, in this illustration, the file attached to email 254 is either a new file or does not include any changes in relation to files previously transmitted by the user. Accordingly, the compare indicator field 212 is empty (or otherwise disabled) in email indicator 254. Similarly, as illustrated in FIG. 2A, the compare indicator field 212 is enabled for email 256.

Additionally, in embodiments, the received emails may include redline (i.e., readily perceivable change) information. In one example, as illustrated in the preview pane (located below the incoming email listing), an email that has a "change indicator field" 212 turned on includes the original file attachment 262 (as sent by a sender), and a corresponding redline document (e.g., file1_redline 264). As previously described, this redline document would represent changes to the received file 262 in redline format. In another example, as illustrated in FIG. 2B, the received email may also include the redline changes as an embedded portion of the email. As explained above, the user may change control settings to indicate the types of visual indicators and change summaries the user would like to receive. In the example of FIG. 2B, the user has opted to receive both a redline file 262 and an embedded version of the redline changes in the body 274 of the email. Having this option (i.e., the option of embedded redline changes in the body of the email) would allow a user to easily view and comprehend the changes, even on a smartphone, without having to download or open the file attachments.

FIG. 2C illustrates an embodiment where the reporting module 1310 provides visual indicators of "difference values." As previously described, in some embodiments, the compare service 136 computes difference values that are indicative of the amount of changes in the received file relative to the transmitted file. This difference value may be reported directly through the email application in several manners. In a first example, as illustrated in FIG. 2C, a percentage value of the changes may be displayed as hovering text over the email indicator 252. In a second example, a bar chart or any other type of pictorial representation may be displayed in the form of a hovering pop-up. In another example, a background color of the change indicator 212 corresponding to email indicator 252 may be changed in relation to the amount of change. For example, in an illustrative embodiment, the background color of change indicator 212 may be red if there is more than 75% change in the received file, orange if there is between 50% and 75% change in the received file, green if there is between 25% and 50% change in the received file, etc.

FIG. 3A is a flow diagram illustrating an operation of the receiving module 1302 of the change service 136. In embodiments, as indicated in block 302, the receiving module 1302 receives a first email that a user wishes to transmit to another person. At block 304, the receiving module 1302 verifies whether the first email has any files attached to it. If the receiving module 1302 detects the presence of at least one file, the process branches to block 306, where the receiving module uniquely tags each file attached to the first email. Otherwise, if no file is attached to the first email, the process proceeds to the return step from block 304. Subsequent to tagging the files at block 304, the process proceeds to block 308, where the receiving module optionally stores a copy of the tagged files for later usage in the matching/comparison operations. It is emphasized that the above process and all subsequent process descriptions merely illustrate exemplary embodiments of the functionalities of the compare service 136 and that variations of the process steps (in terms of varied sequences or omission of the indicated steps) are equally viable alternatives.

FIG. 3B is a flow diagram illustrating a process for monitoring emails received by an email application. As depicted, at block 352, the compare service 136 receives or intercepts an email that is intended to be delivered to the user. At block 354, the compare service 136 determines whether the email has one or more file attachments. If files are identified, the process shifts to block 356, where the compare service 356 further determines whether the files have tags that are unique to the compare service. If the process determines that the tags are indeed unique to the compare service, the process shifts to block 358, where the compare service 136 identifies a file (that was previously transmitted in an email sent by the user) that matches the received file's tag. Subsequently, at block 360, the process compares contents of the received file with contents of the file identified at block 358. Block 362 determines whether any changes are detected. If changes are detected in the contents of the files, the process shifts to block 362, where the compare service 136 performs a suitable reporting action (e.g., provide a visual indicator in relation to the email indicator, provide an indicator of a difference value representing percentage amount of difference in contents of the files, etc.).

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times.

Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention. Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the invention.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or bightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Generally, program modules include routines, programs, objects, components, that perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system for monitoring changes in a document exchanged over email, the system comprised of a data storage module further comprised of a first document file, the method comprising:

prior to transmitting an outgoing email, identifying the presence of a first document file as an attachment to the outgoing email;

upon identifying the presence of the first document file attachment, attaching a first tag data uniquely identifying the first document file prior to the transmitting of the outgoing email;

transmitting from the computer system an outgoing email message comprised of the first document file attached to the outgoing email message and the first tag data uniquely identifying the first document file;

storing the first tag in a database record that references the first document, said database record accessible by the transmitting computer system;

receiving at the computer system an incoming email message comprised of a second document file attached to the incoming email message and a second tag data uniquely identifying the second document file;

executing a query on the database in order to select the first document file by determining using computer logic that the second tag data and the first tag data identify two versions of the same document;

extracting text data from the first document file and the second document file and using the extracted text data to compare the first document file and the second document file in order to identify at least one changes made to contents of the first document file in relation to the second document file; and using the results of the compare step to compute a difference value between contents of the first file and the second file.

2. The method of claim 1, wherein the difference value is represented as at least one of:

a percentage of difference in contents of the first file in relation to contents of the second file; or a graphical icon representing difference in contents of the first file in relation to contents of the second file.

3. The method of claim 1, wherein the difference value is displayed as at least one of:

a hovering field when a user directs a pointer over the indicator of the first email;

an embedded field in the email application in relation to the indicator of the first email; or a change in background color of the indicator of the first email in the email application, where the background color is indicative of a degree of change between contents of the first file and the second file.

4. The method of claim 1, wherein the compare step is comprised of at least one of:

comparing a change in formatting;
comparing a change in textual data;
comparing a change in image data; or
comparing a change in presentation-related information when the first file and the second file are slide decks.

5. A method performed by a computer system for monitoring attachments to email messages, the method comprising:

prior to transmitting an outgoing email, identifying the presence of a first document file as an attachment to the outgoing email;

upon identifying the presence of the first document file attachment, attaching a first tag data uniquely identifying the first document file prior to the transmitting of the outgoing email;

detecting a second file attached to an incoming second email that is received by the email program said second file further comprised of a second tag data uniquely identifying the second file;

determining whether the second tag extracted from the second email and the first tag associated with the first file correspond to different versions of the same document;

upon determining that the second tag and the first tag correspond to different versions of the same document, extracting text data from the first and second files, comparing using a compare service the extracted data of the first file and the second file to identify one or more changes made to contents of the second file in relation to the first file;

based on the comparison of contents of the first file and the second file, computing a difference value between contents of the first file and the second file; and transmitting or displaying the difference value.

6. The method of claim 5, wherein the difference value is represented as one or more of:

a percentage of difference in contents of the second file in relation to contents of the first file; or a graphical icon representing difference in contents of the second file in relation to contents of the first file.

7. The method of claim 5, wherein the difference value is displayed as one or more of:

a hovering field when a user directs a pointer over the indicator of the second email;

an embedded field in the email application in relation to the indicator of the second email; or a change in background color of the indicator of the second email in the email application, where the background color is indicative of a degree of change between contents of the first file and the second file.

8. The method of claim 5 further comprising:

maintaining, by the compare service, a compare database, wherein the compare database includes one or more tags uniquely associated with the compare service identifying corresponding files transmitted via the email application.

9. The method of claim 8, further comprising:

maintaining, by the compare service, a copy of the corresponding files for use in later comparison steps.

10. The method of claim 8, wherein the compare database is local in relation to the email program.

11. The method of claim 8, wherein the compare database is located in a remote server in relation to the email program application.

12. The method of claim 5, wherein the step of comparing the first file and the second file includes one or more of:

comparing a change in formatting;
comparing a change in textual data;
comparing a change in image data; or
comparing a change in presentation-related information when the first file and the second file are slide decks.

13. The method of claim 5, further comprising:

generating a report file, wherein the report file is a redline representation of the comparison of the first and second files; and including the report file as an attachment to the first email.

14. The method of claim 5, further comprising:
generating a report file, wherein the report file is a redline representation of the comparison of the first and second files; and
embedding contents of the report file directly within a body of the first email.

15. A system comprised of at least one central processing unit operatively connected to at least one data storage device, for tracking changes in data files stored on the at least one data storage device, where the data files encode versions of documents transmitted by computers operating at least one email program, the system comprising:
a tagging module configured by logic to attach, upon detecting a first file attachment being made to an outgoing email message, a corresponding tag data to the detected first file attachment prior to the email application program transmitting the outgoing email message, the tag data being a number uniquely identifying the detected first file attachment;
a receiving module configured by logic to receive data representing an incoming email message comprised of a second data file attachment and a second tag data uniquely identifying the second document file attachment;
a matching module configured by logic to use the at least one central processing unit logic to:
match the second tag data to at least one file identifier data stored in the at least one data storage device representing file identifiers uniquely identifying one or more data files previously transmitted by the system in order to select the first document data file from the one or more previously transmitted data files whose file identifier data identifies a file that is a different version of the same document as the second document file identifier data; and
a document comparing module configured by logic to use the at least one central processing unit logic to compare the second document data file and the selected first document data file in order to identify one or more changes made to the contents of the first document data file in relation to the second document data file.

16. The system of claim 15 further comprising:
a reporting module configured by logic to use the at least one central processing unit logic to:
use the output of the document comparing module in order to compute a difference value between contents of the first data file and the second data file; and
transmit or display the difference value on the display device,
wherein the difference value is represented as at least one of:
a percentage of difference in contents of the first data file in relation to contents of the second data file; or
a graphical icon representing difference in contents of the first data file in relation to contents of the second data file.

17. The system of claim 16, wherein the difference value is displayed on the display device as at least one of:
a hovering field that is displayed on the display device when the system detects the condition that a user directs a pointer component of a graphical user interface over an indicator icon associated with the incoming email;
an embedded field in the email application in relation to the indicator icon associated with the incoming email; or a change in background color of the indicator icon associated with the incoming email in the email application, where the background color is indicative of a degree of change between contents of the first data file and the second data file.

18. The system of claim 16, wherein the comparing of the first data file and the second data file, as executed by the comparing module, includes one or more of:
comparing a change in formatting data;
comparing a change in textual data;
comparing a change in image data; or
comparing a change in presentation-related information when the first data file and the second data file are slide decks.

19. The system of claim 16, wherein the reporting module is further configured by logic to:
generate a report data file, wherein the report file is a red line representation of the comparison of the first and second files.

20. A computer system for monitoring document files representing versions of a document that are attachments in to emails messages, the system comprising:
a processor;
a memory configured by logic to store a set of instructions, which when executed by the processor cause the system to perform a method, the method comprised of the steps:
prior to transmitting an outgoing email, identifying the presence of a first document file as an attachment to the outgoing email;
upon identifying the presence of the first document file attachment, attaching a first tag data uniquely identifying the first document file prior to the transmitting of the outgoing email;
transmitting from the computer system the outgoing email message comprised of the first document file attached to the outgoing email message representing a first document that contains a first tag data uniquely identifying the first document;
storing the first tag data in a database record that references the first document file, said database record accessible by the computer system;
receiving at the computer system as part of an incoming email message a second document file attached to the incoming email message comprised of a second tag data uniquely identifying the second document file;
executing a query on the database in order to select the first document file by determining that the second tag data and the first tag data identify the same document;
extracting text data from the first document file and the second document file and using the extracted text data to compare the first document file and the second document file in order to identify at least one changes made to contents of the first document file in relation to the second document file; and
using the results of the compare step to compute a difference value between contents of the first document file and the second document file.

21. The system of claim 20, wherein the difference value is represented as one or more of:
a percentage of difference in contents of the second file in relation to contents of the first file; or
a graphical icon representing difference in contents of the second file in relation to contents of the first file.

22. The system of claim 20, further comprising displaying the difference value, wherein the difference value is displayed as one or more of:

a hovering field when a user directs a pointer over the indicator of the incoming email;

an embedded field in the email application in relation to the indicator of the incoming email; or a change in background color of the indicator of the incoming email in the email application, where the background color is indicative of a degree of change between contents of the first file and the second file.

23. The system of claim 20, wherein the comparing of the first file and the second file is comprised of at least one of:

comparing a change in formatting;

comparing a change in textual data;

comparing a change in image data; or comparing a change in presentation-related information when the first file and the second file are slide decks.

24. The system of claim 5, wherein the method further comprises:

generating a report file, wherein the report file is a redline representation of the comparison of the first and second files.

25. The system of claim 20, wherein the system is further adapted to:

generate a report file, wherein the report file is a redline representation of the comparison of the first and second files.

* * * * *